United States Patent [19]
Blaney

[11] Patent Number: 5,679,248
[45] Date of Patent: Oct. 21, 1997

[54] COEXTRUDED BLOCKS AND APPLICATIONS THEREFOR

[75] Inventor: Carol Ann Blaney, Roswell, Ga.

[73] Assignee: Kimberly-Clark Worldwide, Inc., Neenah, Wis.

[21] Appl. No.: 575,010

[22] Filed: Dec. 19, 1995

[51] Int. Cl.$^6$ .................................................. B01D 29/54
[52] U.S. Cl. ................... 210/315; 210/489; 210/496; 210/510.1; 264/45.9; 264/46.1
[58] Field of Search .......................... 210/315, 489, 210/496, 570.1; 264/45.9, 46.1

[56] References Cited

U.S. PATENT DOCUMENTS

| | | | |
|---|---|---|---|
| 2,475,767 | 7/1949 | Williams et al. | 44/10 |
| 2,475,768 | 7/1949 | Williams et al. | 44/10 |
| 2,475,769 | 7/1949 | Williams et al. | 44/10 |
| 3,227,530 | 1/1966 | Levelton | 44/1 |
| 3,726,651 | 4/1973 | Ronden | 44/14 |
| 3,947,255 | 3/1976 | Harman et al. | 44/10 |
| 3,950,251 | 4/1976 | Hiller | 210/315 X |
| 3,973,922 | 8/1976 | Williams | 44/13 |
| 4,120,666 | 10/1978 | Lange | 44/14 |
| 4,243,393 | 1/1981 | Christian | 44/14 |
| 4,437,952 | 3/1984 | Smith et al. | 204/98 |
| 4,810,255 | 3/1989 | Fay, III et al. | 44/14 |
| 4,834,774 | 5/1989 | Fay, III et al. | 44/14 |
| 5,112,692 | 5/1992 | Strassel et al. | 428/421 |
| 5,164,085 | 11/1992 | Spokoiny et al. | 210/256 |
| 5,183,608 | 2/1993 | Guile | 264/44 |
| 5,189,092 | 2/1993 | Koslow | 524/495 |
| 5,249,948 | 10/1993 | Koslow | 425/376.1 |
| 5,331,037 | 7/1994 | Koslow | 524/496 |

FOREIGN PATENT DOCUMENTS

| | | |
|---|---|---|
| 910712 | 9/1972 | Canada . |
| 41 33 136 | 6/1992 | Germany . |
| 60-261521 | 12/1985 | Japan . |
| 89/05285 | 6/1989 | WIPO . |
| 92/22514 | 12/1992 | WIPO . |

OTHER PUBLICATIONS

Abstract for JP 06-100719A dated Apr. 12, 1994.
Search Report for PCT/US96/18641 dated Mar. 20, 1997.

*Primary Examiner*—W. L. Walker
*Attorney, Agent, or Firm*—William E. Maycock

[57] ABSTRACT

A coextruded block composite which includes a porous first block. The block is permeable to fluids and includes a granular component and a binder component. The block has interconnected pores therethrough having a first average diameter. The composite also includes a second block. In addition, at least one of the first block and the second block is continuous and at least a portion of the second block is contiguous with at least a portion of the first block. The second block also may be permeable to fluids. Additional blocks may be present, if desired. One or more of the blocks other than the first block may be a porous block having a granular component and a thermoplastic binder component. The coextruded block composite may be employed as a filter medium.

25 Claims, 8 Drawing Sheets

COEXTRUDED BLOCKS AND APPLICATIONS THEREFOR

BACKGROUND OF THE INVENTION

The present invention relates to a porous composite which may be used as a filter medium.

In general, filtration involves the removal of suspended solids from a fluid by passing the fluid through a porous medium. The porous medium may be paper, cloth, or wire cloth. The latter two types of media are especially important in high-volume, continuous commercial processes which utilize rotary drum or belt filters.

There are, however, numerous applications which require smaller, often disposable, filter media. Such media include paper; beds of particulate matter, such as activated carbon and diatomaceous earth; and solid porous filter elements. Solid porous filter elements are especially desirable for ease of handling and ready disposability.

Solid porous filter elements may be made by a batch process which is both time consuming and labor intensive. More recently, they may be formed continuously by extruding a mixture of a thermoplastic binder material and a powdered or granular primary material such as activated carbon. Nevertheless, opportunities for improvements in the extrusion of solid porous filter elements remain.

SUMMARY OF THE INVENTION

The present invention addresses some of the difficulties and problems discussed above by providing a coextruded block composite which includes a porous first block. The block is permeable to fluids and includes a granular component and a thermoplastic binder component. The block has interconnected pores therethrough having a first average diameter. The composite also includes a second block. In addition, at least one of the first block and the second block is continuous and at least a portion of the second block is contiguous with at least a portion of the first block. By way of example, the granular component of the first block may be activated carbon, ceramic particles, zeolite particles, inert particles, sand, surface charge-modified particles, and mixtures thereof.

If desired, the second block may be a porous block which is permeable to fluids, is comprised of a granular component and a thermoplastic binder component, and has interconnected pores therethrough having a second average diameter. The granular component may be, for example, activated carbon, ceramic particles, zeolite particles, inert particles, sand, surface charge-modified particles, and mixtures thereof. The second block may be continuous or discontinuous. In certain embodiments, the second average diameter may be different from the first average diameter.

The coextruded block composite may include a third block which is permeable to fluids, is comprised of a granular component and a thermoplastic binder component, and has interconnected pores therethrough having a third average diameter. At least a portion of the third block will be contiguous with at least a portion of the first block or the second block. In certain embodiments, the first, second, and third average diameters are adapted to give the coextruded block a gradient pore structure. In addition, the granular component of the third block may be activated carbon, ceramic particles, zeolite particles, inert particles, sand, surface charge-modified particles, and mixtures thereof.

Additionally, the coextruded block composite may include a fourth block which is permeable to fluids, is comprised of a granular component and a thermoplastic binder component, and has interconnected pores therethrough having a fourth average diameter. At least a portion of the fourth block will be contiguous with at least a portion of the first block, the second block, or the third block. The first, second, third, and fourth average diameters may be adapted to give the coextruded block a gradient pore structure. The granular component of the fourth block may be activated carbon, ceramic particles, zeolite particles, inert particles, sand, surface charge-modified particles, and mixtures thereof.

If desired, the second block of the coextruded block composite may be impermeable to fluids. The second block may be continuous or discontinuous. For example, the second block may be a thermoplastic polyolefin block, such as a polypropylene block. If desired, the second block may be adapted to direct a fluid through the first block from a first portion thereof to a second portion thereof along a predetermined pathway.

The present invention also provides, in a method of preparing a coextruded block composite which includes:

extruding a mixture of granules and a thermoplastic binder from an extruder barrel into a die;

heating the mixture to a temperature which is greater than the softening temperature of the thermoplastic binder and less than the softening temperature of the granules;

applying sufficient back pressure to the heated mixture within the die to covert the heated mixture into a substantially homogeneous composite material;

cooling the composite material to a temperature below the softening point of the thermoplastic binder; and extruding the composite material from the die; the improvement which involves:

exciting the die and/or extruder barrel at at least one location with subsonic, sonic, or ultrasonic energy which varies in frequency and/or amplitude in a manner adapted to aid in either or both the extrusion of the mixture of granules and a thermoplastic binder from an extruder barrel into a die and the extrusion of the composite material from the die.

The present invention also provides a filter medium which includes a coextruded block composite of the present invention.

DETAILED DESCRIPTION OF THE INVENTION

The term "interconnected pores therethrough" in reference to a block is used herein to mean that essentially all of the pores present in the block are connected to adjacent pores, thereby resulting in a plurality of more or less tortuous pathways from one surface or location to another surface or location. Because the pores are interconnected, a fluid may pass completely through a block. That is, the fluid may enter a block at one location and pass through the block to exit at another location. Thus, the block is "permeable" to a fluid.

As used herein, the term "fluid" is meant to include both gases and liquids.

The term "porous block" is used herein to mean a block which is porous and permeable to a fluid. The term "granular" is to be broadly construed as encompassing any particulate material, regardless of particle sizes, which may be suitable for use in the present invention. Thus, the term is intended to include powders.

As used herein, the term "thermoplastic binder" means any binder, typically a polymer, which is thermoplastic, i.e., capable of softening and flowing when heated and of hardening again when cooled. Examples of thermoplastic binders include, by way of illustration only, end-capped polyacetals, such as poly(oxymethylene) or polyformaldehyde, poly(trichloroacetaldehyde), poly(n-valeraldehyde), poly(acetaldehyde), poly(propionaldehyde), and the like; acrylic polymers, such as polyacrylamide, poly(acrylic acid), poly(methacrylic acid), poly(ethyl acrylate), poly(methyl methacrylate), and the like; fluorocarbon polymers, such as poly(tetrafluoroethylene), perfluorinated ethylene-propylene copolymers, ethylenetetrafluoroethylene copolymers, poly(chlorotrifluoroethylene), ethylene-chlorotrifluoroethylene copolymers, poly(vinylidene fluoride), poly(vinyl fluoride), and the like; polyamides, such as poly(6-aminocaproic acid) or poly(ε-caprolactam), poly(hexamethylene adipamide), poly(hexamethylene sebacamide), poly(11-aminoundecanoic acid), and the like; polyaramides, such as poly(imino-1,3-phenyleneiminoisophthaloyl) or poly(m-phenylene isophthalamide), and the like; parylenes, such as poly-p-xylylene, poly(chloro-p-xylylene), and the like; polyaryl ethers, such as poly(oxy-2,6-dimethyl-1,4-phenylene) or poly(p-phenylene oxide), and the like; polyaryl sulfones, such as poly(oxy-1,4-phenylenesulfonyl-1,4-phenyleneoxy-1,4-phenylene-isopropylidene-1,4-phenylene), poly(sulfonyl-1,4-phenyleneoxy-1,4-phenylenesulfonyl-4,4'-biphenylene), and the like; polycarbonates, such as poly(bisphenol A) or poly(carbonyldioxy-1,4-phenyleneisopropylidene-1,4-phenylene), and the like; polyesters, such as poly(ethylene terephthalate), poly(tetramethylene terephthalate), poly(cyclohexylene-1,4-dimethylene terephthalate) or poly(oxymethylene-1,4-cyclohexylenemethyleneoxyterephthaloyl), and the like; polyaryl sulfides, such as poly(p-phenylene sulfide) or poly(thio-1,4-phenylene), and the like; polyimides, such as poly(pyromellitimido-1,4-phenylene), and the like; polyolefins, such as polyethylene, polypropylene, poly(1-butene), poly(2-butene), poly(1-pentene), poly(2-pentene), poly(3-methyl-1-pentene), poly(4-methyl-1-pentene), and the like; vinyl polymers, such as poly(vinyl acetate), poly(vinylidene chloride), poly(vinyl chloride), and the like; diene polymers, such as 1,2-poly-1,3-butadiene, 1,4-poly-1,3-butadiene, polyisoprene, polychloroprene, and the like; polystyrenes; copolymers of the foregoing, such as acrylonitrile-butadiene-styrene (ABS) copolymers, and the like; and the like.

As used herein, the term "gradient pore structure" means that the average pore diameters of two or more porous blocks constituting the coextruded block composite of the present invention increase or decrease from the first block to each subsequent block. When a coextruded block composite includes only two porous blocks, the composite will have a gradient pore structure whenever the two porous blocks have different average pore diameters. Thus, a fluid entering either of the two blocks of necessity must pass into and through a block having an average pore diameter which is either greater than or less than that of the porous block from which the fluid is exiting. When a composite includes more than two porous blocks, a gradient pore structure will exist when a fluid passing through the composite enters one porous block and passes sequentially into and through the remaining porous blocks and the average pore diameter of each porous block in the sequence is either greater than or lesser than the average pore diameter of the preceding block in the sequence.

In general, the term "thermoplastic polyolefin" is used herein to mean any thermoplastic polyolefin which may be melt-extruded. Examples of thermoplastic polyolefins include polyethylene, linear low density polyethylene, polypropylene, poly(1-butene), poly(2-butene), poly(1-pentene), poly(2-pentene), poly(3-methyl-1-pentene),poly(4-methyl-1-pentene), and the like. In addition, such term is meant to include blends of two or more polyolefins and random and block copolymers prepared from two or more different unsaturated monomers. Because of their commercial importance, the most desired polyolefins are polyethylene, linear low density polyethylene, and polypropylene.

As stated earlier, the present invention provides a coextruded block composite which includes a porous first block and a second block. The first block is permeable to fluids, includes a granular component and a thermoplastic binder component, and has interconnected pores therethrough having a first average diameter. In addition, at least one of the first block and the second block is continuous and at least a portion of the second block is contiguous with at least a portion of the first block. By way of example, the granular component of the first block may be activated carbon, ceramic particles, zeolite particles, inert particles, sand, surface charge-modified particles, and mixtures thereof.

In some embodiments, the second block is permeable to fluids, includes a granular component and a thermoplastic binder component, and has interconnected pores therethrough having a second average diameter. The second average diameter may be the same as or different from the first average diameter. The granular component of the second block may be selected from the group consisting of activated carbon, ceramic particles, zeolite particles, inert particles, sand, surface charge-modified particles, and mixtures thereof. The second block may be continuous or discontinuous.

The coextruded block composite may include a third block which is permeable to fluids, includes a granular component and a thermoplastic binder component, and has interconnected pores therethrough having a third average diameter. At least a portion of the third block is contiguous with at least a portion of the first block or the second block. In some embodiments, the first, second, and third average diameters are adapted to give the coextruded block composite a gradient pore structure. The granular component of the third block may be selected from the group consisting of activated carbon, ceramic particles, zeolite particles, inert particles, sand, surface charge-modified particles, and mixtures thereof.

Additionally, the coextruded block composite may include a fourth block which is permeable to fluids, includes a granular component and a thermoplastic binder component, and has interconnected pores therethrough having a fourth average diameter. At least a portion of the fourth block is contiguous with at least a portion of the first block, the second block, or the third block. The first, second, third, and fourth average diameters may be adapted to give the coextruded block a gradient pore structure. The granular component of the fourth block is selected from the group consisting of activated carbon, ceramic particles, zeolite particles, inert particles, sand, surface charge-modified particles, and mixtures thereof.

If desired, the second block may be impermeable to fluids and also may be either continuous or discontinuous. Furthermore, the second block may be adapted to direct a fluid through the first block from a first portion thereof to a second portion thereof along a predetermined pathway. By way of example, the second block may be a thermoplastic polyolefin block, such as a polypropylene block.

The present invention also provides, in a method of preparing a coextruded block composite which includes:

extruding a mixture of granules and a thermoplastic binder from an extruder barrel into a die;

heating the mixture to a temperature which is greater than the softening temperature of the thermoplastic binder and less than the softening temperature of the granules;

applying sufficient back pressure to the heated mixture within the die to covert the heated mixture into a substantially homogeneous composite material;

cooling the composite material to a temperature below the softening point of the thermoplastic binder; and extruding the composite material from the die; the improvement which includes:

exciting the die and/or extruder barrel at at least one location with subsonic, sonic, or ultrasonic energy which varies in frequency and/or amplitude in a manner adapted to aid in either or both the extrusion of the mixture of granules and a thermoplastic binder from an extruder barrel into a die and the extrusion of the composite material from the die.

The extrusion of a mixture of particles and a thermoplastic binder to make a porous block, referred to herein as extruded block technology, is known (see, e.g., U.S. Pat. Nos. 5,189,092, 5,249,948, and 5,331,037 to Koslow, each of which is incorporated herein by reference). Briefly, a mixture of granules and a thermoplastic binder is extruded from an extruder barrel into a die. The mixture is heated to a temperature which is greater than the softening temperature of the thermoplastic binder and less than the softening temperature of the granules. Sufficient back pressure then is applied to the heated mixture within the die to covert the heated mixture into a substantially homogeneous composite material. The composite material is cooled to a temperature below the softening point of the thermoplastic binder and extruded from the die.

A key challenge in making extruded block technology viable is inducing the semi-solid mixture of particles and thermoplastic binder to flow along an extruder and through a die. In accordance with the method of the present invention, vibratory energy is applied to the extruder and/or die during processing, thereby aiding the flow of the particle-binder mixture through the extruder and die. This vibratory energy may be applied to the extruder and/or die by means of piezoelectric devices which are well known in the art. The optimum frequencies and amplitudes necessary to aid the mixture flow may vary with equipment design, processing speeds, particle sizes, binder selection, and processing conditions (e.g., temperature and pressure). In addition, the optimum frequencies and amplitudes may vary with time. Consequently, a computer-controlled generator is recommended which would, using built-in feedback loops, continually optimize frequency and amplitude patterns as a function of time. Such patterns may be different at various locations along the length of the extruder and/or die, and the frequency ranges may include subsonic, sonic, and/or ultrasonic vibrations.

Figure 1:
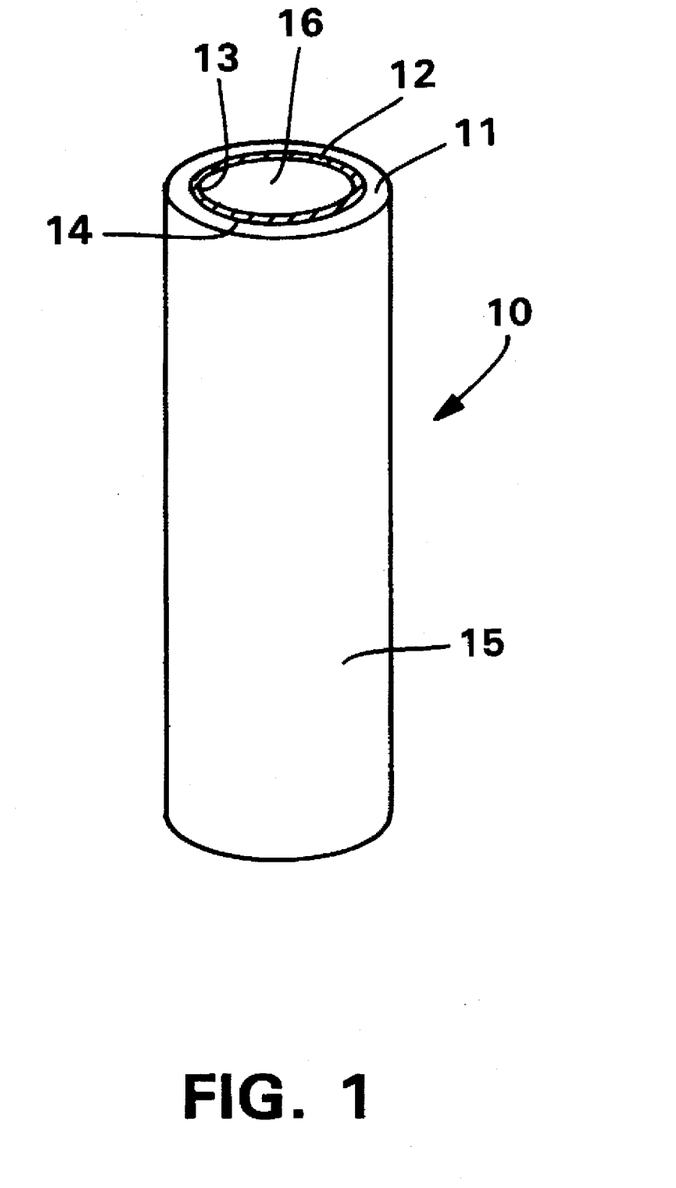
FIGS. 1–5 and 8 are perspective views illustrating different embodiments of the coextruded block composite of the present invention.

In its simplest form, the coextruded block composite of the present invention consists of a porous first block and a second block, one embodiment of which is illustrated by FIG. 1. In FIG. 1, a coextruded block composite 10 consists of a cylindrical porous first block 11 and a cylindrical second block 12 which also is porous. The porous blocks 11 and 12 are concentric and continuous; the outer surface 13 of the second block 12 is contiguous with the inner surface 14 of the first block 11. The composite illustrated by FIG. 1 may be made by extruding the two different particle-binder mixtures through a die consisting of two concentric circular openings.

The porous first block 11 may be, for example, an activated carbon block having a first average pore diameter of 3 micrometers. The porous second block 12 may be, again by way of example, a ceramic particle block having a second average pore diameter of 0.3 micrometers. To use the composite 10 as a filter medium, a fluid, such as water or air, may enter the medium at the outer surface 15 of the porous first block 11 and exit the medium from the inner surface 16 of the second block 12. If desired, the pathway of the fluid passing through the composite 10 may be reversed by simply reversing the compositions of the porous blocks 11 and 12.

One example of a product represented by the composite shown in FIG. 1 is a water filter in the form of a hollow tube, in which two components form two concentric cylinders. The outer cylinder is a 3 micrometer absolute activated carbon block filter which removes Class 1 chlorine, taste, and odor, Class 1 lead, and Class 1 turbidity removing protozoan cysts (e.g. cryptosporidium and giardia cysts). The inner cylinder is a 0.3 micrometer absolute ceramic particle block filter which removes all remaining bacteria (water flow is towards the center of the hollow tube filter).

Figure 2:
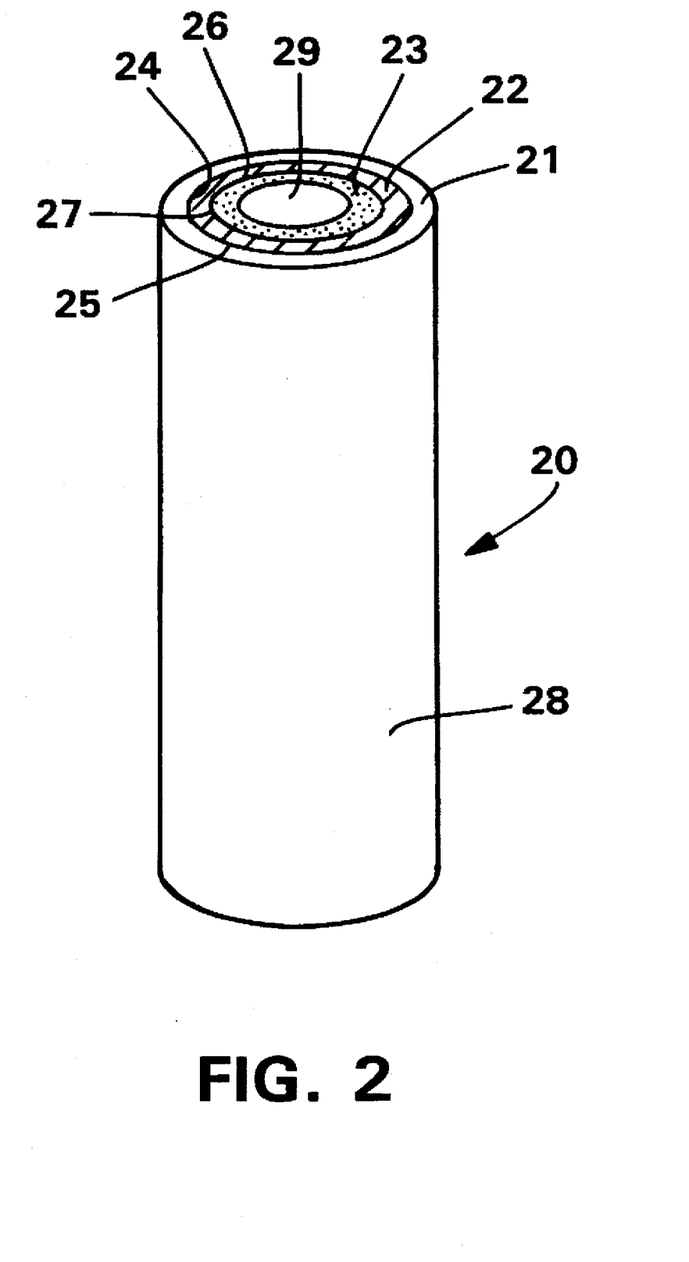

If desired, a third block may be added to the composite 10 shown in FIG. 1. A composite having three blocks is illustrated by FIG. 2. In FIG. 2, a coextruded block composite 20 consists of a cylindrical porous first block 21, a cylindrical second block 22 which also is porous, and a porous cylindrical third block 23. The porous blocks 21, 22, and 23 are concentric and continuous. The outer surface 24 of the second block 22 is contiguous with the inner surface 25 of the first block 21. Similarly, the outer surface 26 of the third block 23 is contiguous with the inner surface 27 of the second block 22. The composite illustrated by FIG. 2 may be made by extruding the three different particle-binder mixtures through a die consisting of three concentric circular openings.

The porous first block 21 may be, for example, an inert particle block having a first average pore diameter of 50 micrometers. The porous second block 22 may be, again by way of example, an activated carbon block having a second average pore diameter of 3 micrometers. The porous third block 23 may be, for example, a ceramic particle block having a third average pore diameter of 0.3 micrometers. To use the composite 20 as a filter medium, a fluid, such as water or air, may enter the medium at the outer surface 28 of the porous first block 21 and exit the medium from the inner surface 29 of the third block 23. If desired, the pathway of the fluid passing through the composite 20 may be reversed by simply reversing the compositions of the first and third porous blocks 21 and 23.

Figure 3:
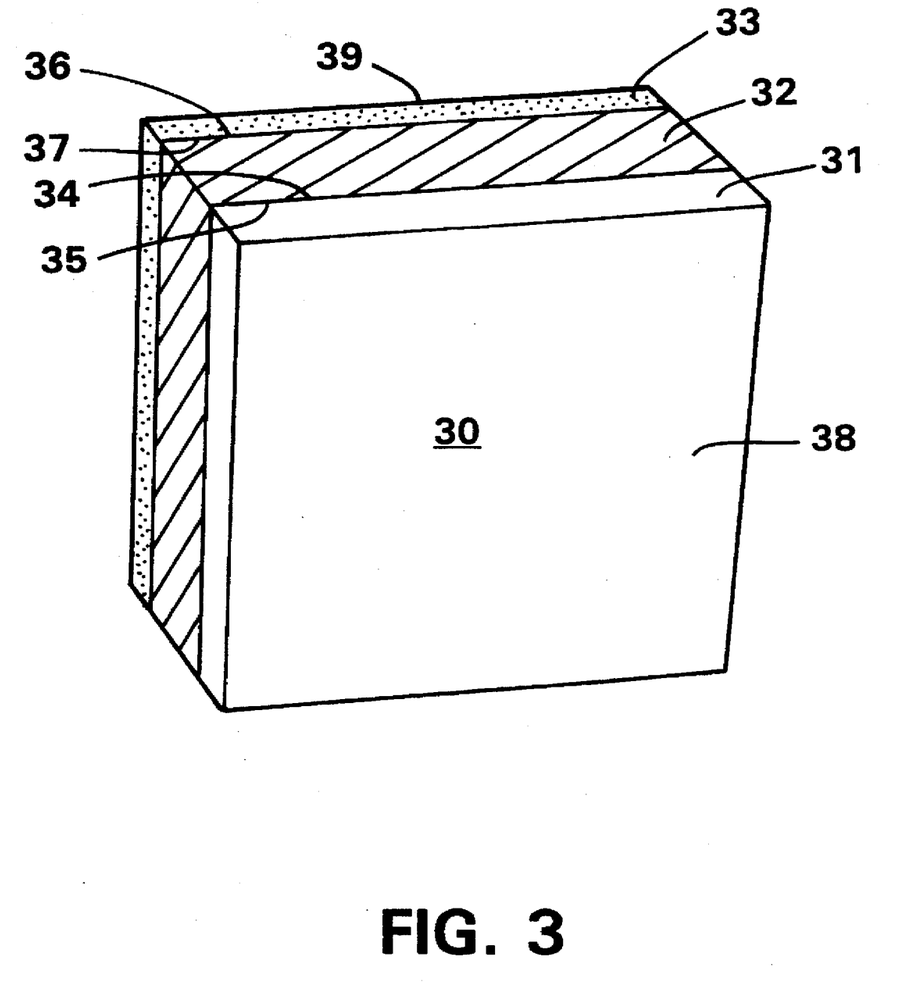

The coextruded block composite of the present invention may be any shape which is capable of coextrusion. FIGS. 1 and 2 illustrate cylindrical composites. A rectangular composite is shown in FIG. 3. In FIG. 3, a coextruded block composite 30 consists of a rectangular porous first block 31, a rectangular second block 32 which also is porous, and a porous rectangular third block 33. All three blocks 31, 32, and 33 are continuous. The outer surface 34 of the second block 32 is contiguous with the inner surface 35 of the first block 31. Similarly, the outer surface 36 of the third block 33 is contiguous with the inner surface 37 of the second block 32. The die used for forming the composite 30 may consist of, for example, a single die with three openings or three separate dies placed side-by-side.

As a filter medium, the porous first block 31 may have a relatively large first average pore diameter and function as a prefilter. The porous second block 32 may have a second average pore diameter which is intermediate in size or of a medium value. The porous third block 33 may have a third average pore diameter which is fine. To use the composite 30 as, for example, an air filter, air may enter the medium at the outer surface 38 of the porous first block 31 and exit the medium from the inner surface 39 of the third block 33.

Figure 4:
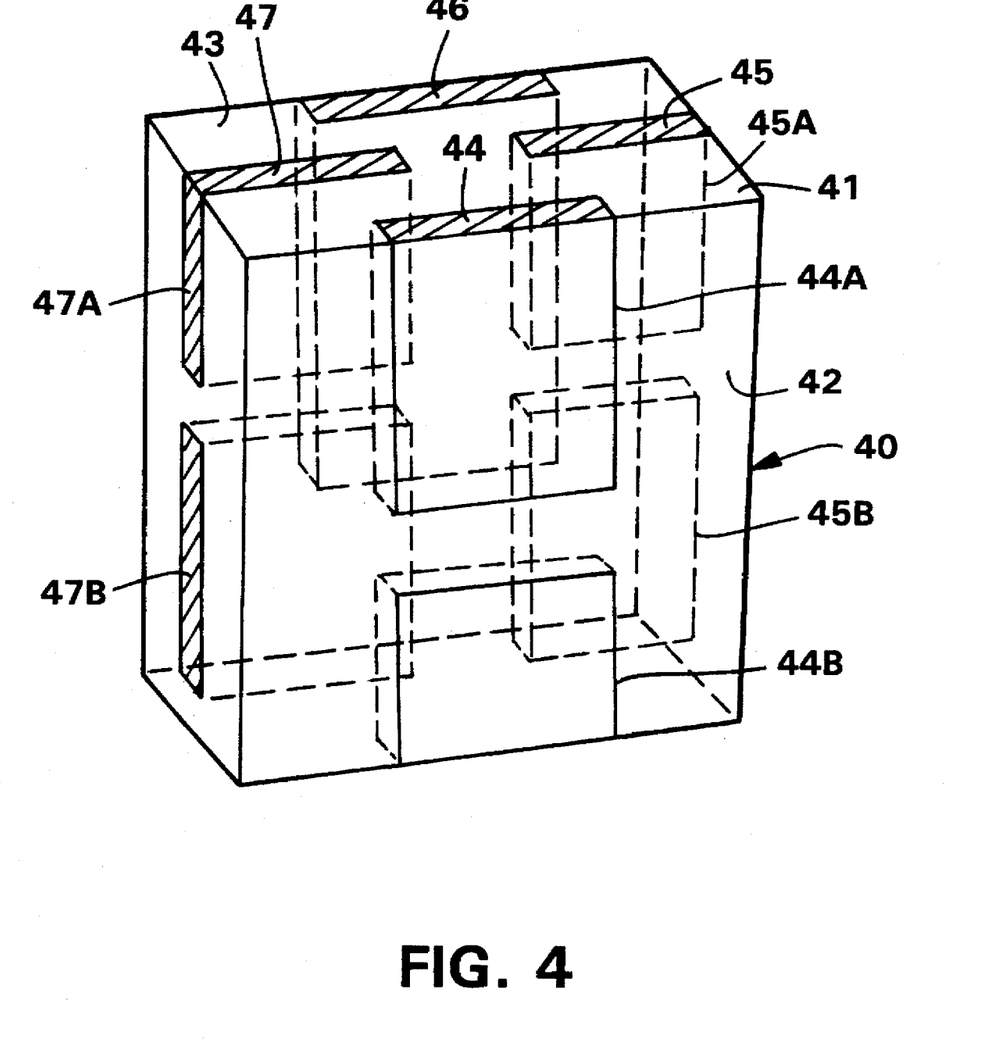

A coextruded block composite which includes a porous first block and four additional blocks is shown in FIG. 4. In FIG. 4, a coextruded block composite 40 consists of a porous first block 41 which is continuous and has a first surface 42 and a second surface 43. The porous first block 41 may be, for example, an activated carbon block. The composite 40 also includes second through fifth blocks 44, 45, 46, and 47, each of which is impermeable and discontinuous. The impermeable blocks 44, 45, 46, and 47 may be, for example, polyolefin, e.g., polypropylene, blocks. In FIG. 4, each of the second through fifth blocks is discontinuous. Thus, block 44 consists of discontinuous sections 44A and 44B. Similarly, blocks 45 and 47 consist of discontinuous sections 45A and 45B and 47A and 47B, respectively.

The die employed for the preparation of the composite 40 may have a single opening, in which are placed a plurality of smaller openings which correspond with the second through fifth blocks. The second through fifth blocks may be rendered discontinuous by stopping and starting the pump or pumps which feed such plurality of smaller openings. The second through fifth blocks may be of the same material. Alternatively, up to four different materials may be utilized.

Thus, the composite 40 of FIG. 4 is an example of a carbon block filter with built-in channels which direct fluid flow, one component of the composite being an activated carbon block. The other components are fluid-impermeable polypropylene blocks which serve as barriers and guides to the fluid flow. This configuration increases the path length of the fluid flowing in and through the activated carbon block, allowing for more residence time and/or mass transfer, thereby improving filtration/adsorption efficiency.

Figure 5:
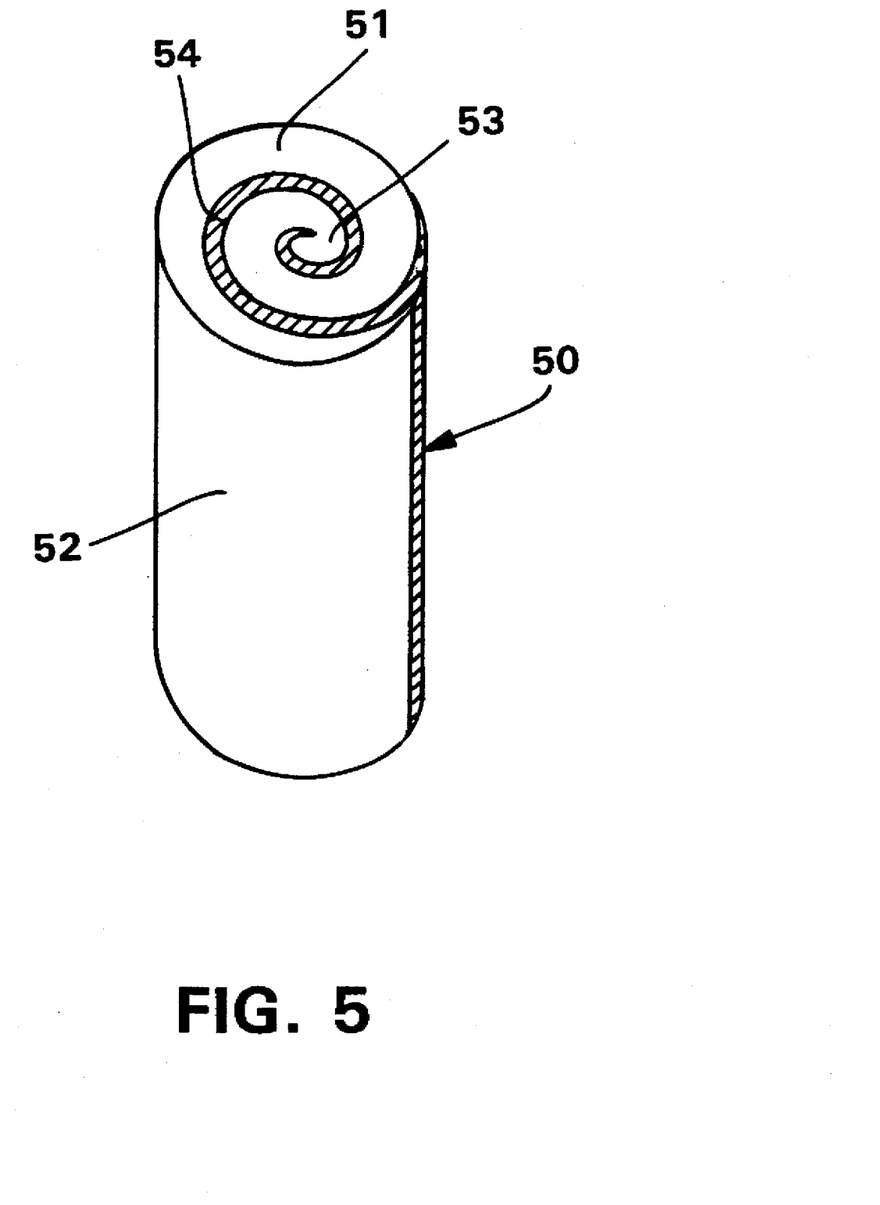

FIG. 5 illustrates a cylindrical coextruded block composite in which the second block is impermeable to fluids. In FIG. 5, a coextruded block composite 50 consists of a continuous porous first block 51 which is spiral-shaped in cross-section and has an outer surface 52 and an inner portion 53. The porous first block 51 may be, for example, an activated carbon block. In addition, the composite 50 includes a continuous second block 54 which is impermeable. The second block 54 may be, for example, a polypropylene block. The second block 54 also is spiral shaped in cross-section and is concentric with the first block 51.

The die employed for the preparation of the composite 50 will have two concentric, spiral-shaped openings, one for each of the materials of which the first and second blocks, respectively, are composed.

By introducing a fluid to be filtered at the outer surface 52 of the first block 51 of the composite 50, the fluid will be directed in a spiral path toward the inner portion 53 of the first block 51. The fluid then would be permitted to exit from either end of the composite 50.

Figure 6:
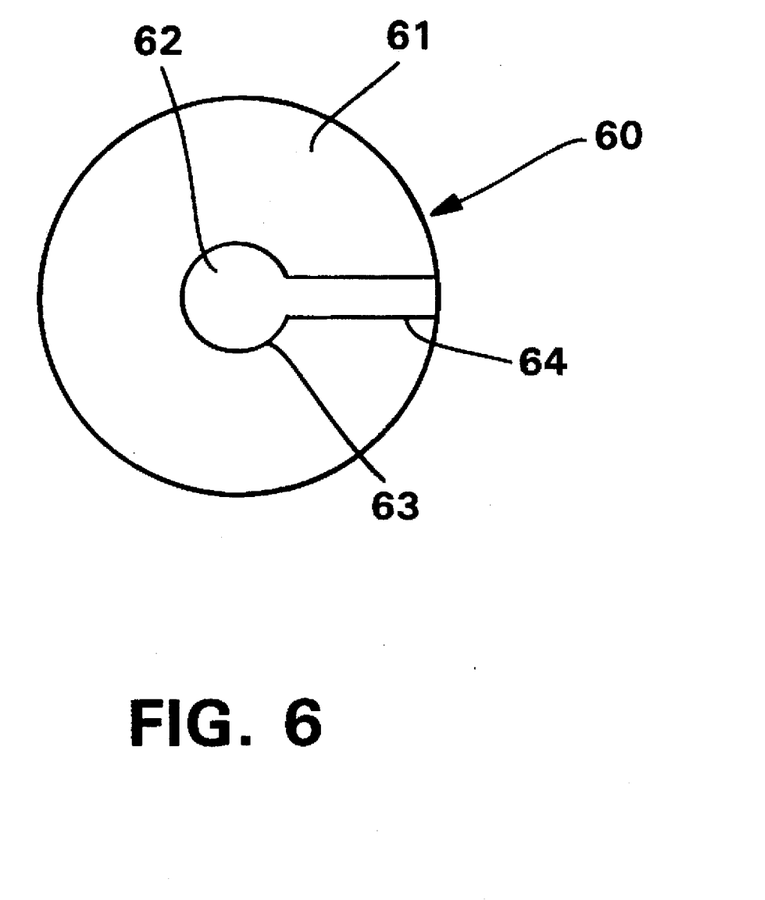
FIG. 6 is a cross-sectional diagrammatic representation of a die which may be used to produce a coextruded block composite of the present invention.

A spiral fluid path also may be achieved by using a die illustrated by FIG. 6. In FIG. 6, the die 60 consists of a first opening 61 and a second opening 62. The second opening 62 has a circular portion 63 and a rectangular portion 64. A continuous porous first block is extruded from the first opening 61 and a continuous, impermeable second block is extruded from the second opening 62. The porous first block 61 may be, for example, an activated carbon block and the impermeable second block may be, for example, a polypropylene block.

Figure 7:
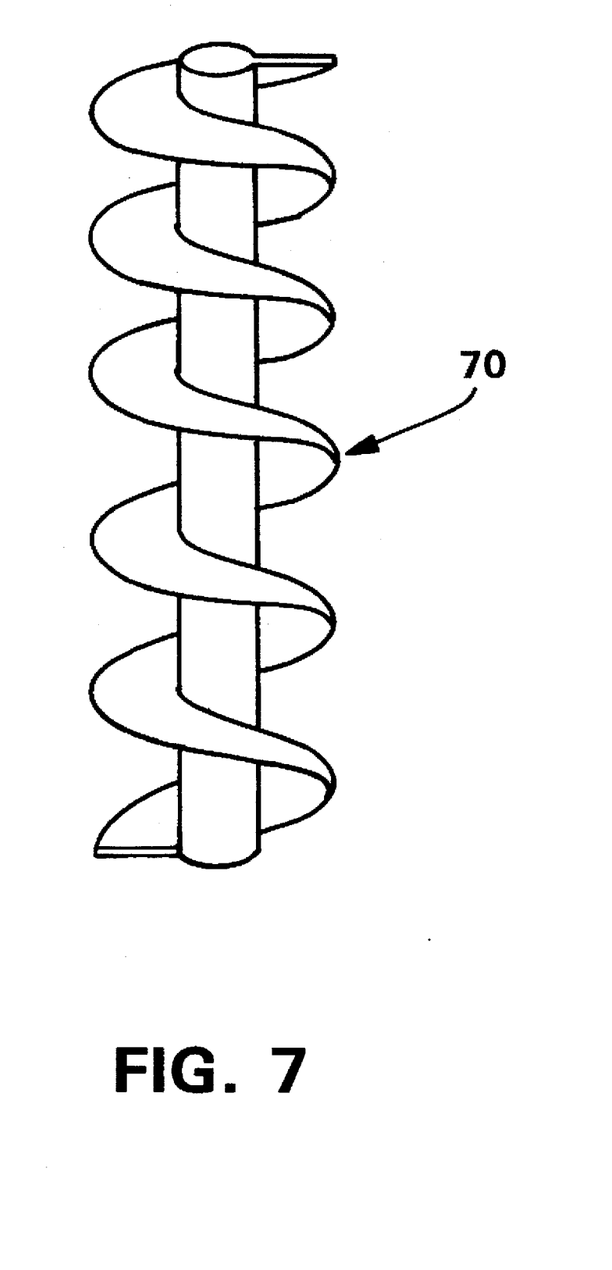
FIG. 7 is perspective view illustrating one of the coextruded blocks resulting from the use of the die of FIG. 6.

The first and second blocks are extruded onto a rotatable metal receiving disk (not shown) which is adjacent to the die. As extrusion proceeds, the metal disk is rotated and gradually moved away from the die at a rate equal to the rate of extrusion. The rotation of the receiving disk imparts a screw shape to the second block as shown in FIG. 7, in which a screw-shaped second block 70 is illustrated diagrammatically.

Figure 8:
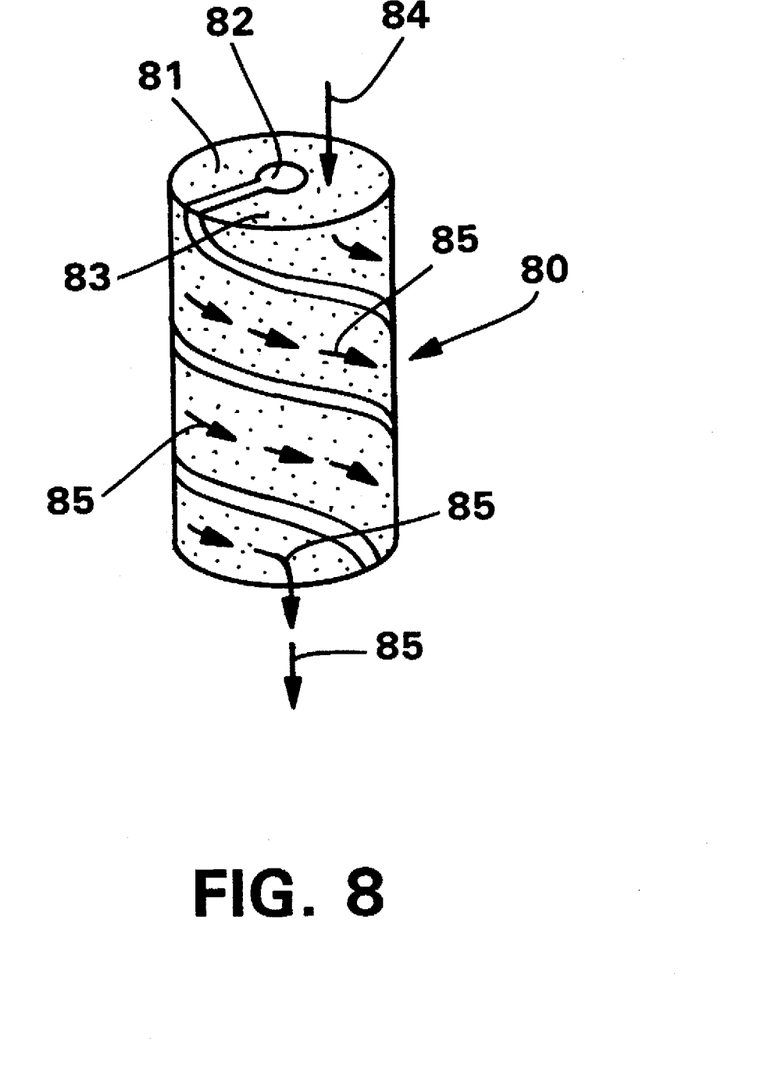

The use of the die 60 of FIG. 6 results in a coextruded block composite illustrated by FIG. 8. In FIG. 8, a coextruded block composite 80 consists of a continuous porous first block 81 and a continuous second block 82 which is impermeable and spiral-shaped. A fluid is introduced at the top surface 83 of the composite 80 as shown by arrow 84. The fluid then is directed spirally downward as shown by arrows 85.

While the specification has been described in detail with respect to specific embodiments thereof, it will be appreciated that those skilled in the art, upon attaining an understanding of the foregoing, may readily conceive of alterations to, variations of, and equivalents to these embodiments.

What is claimed is:

1. A coextruded block composite comprising:
   a porous first block which
      is permeable to fluids;
      is comprised of a granular component and a thermoplastic binder component; and
      has interconnected pores therethrough having a first average diameter; and
   a second block;
   in which
      at least one of the first block and the second block is continuous; and
      at least a portion of the second block is contiguous with at least a portion of the first block.

2. The coextruded block composite of claim 1, in which the second block:
   is permeable to fluids;
   is comprised of a granular component and a thermoplastic binder component; and
   has interconnected pores therethrough having a second average diameter.

3. The coextruded block composite of claim 2, in which the second average diameter is different from the first average diameter.

4. The coextruded block composite of claim 3 which further comprises a third block which:
   is permeable to fluids;
   is comprised of a granular component and a thermoplastic binder component; and
   has interconnected pores therethrough having a third average diameter;

in which at least a portion of the third block is contiguous with at least a portion of the first block or the second block.

5. The coextruded block composite of claim 4 which further comprises a fourth block which:

is permeable to fluids;

is comprised of a granular component and a thermoplastic binder component; and has interconnected pores therethrough having a fourth average diameter;

in which at least a portion of the fourth block is contiguous with at least a portion of the first block, the second block, or the third block.

6. The coextruded block composite of claim 5, in which the first, second, third, and fourth average diameters are adapted to give the coextruded block a gradient pore structure.

7. The coextruded block composite of claim 5, in which the granular component of the fourth block is selected from the group consisting of activated carbon, ceramic particles, zeolite particles, inert particles, sand, surface charge-modified particles, and mixtures thereof.

8. A filter medium which comprises the coextruded block composite of claim 5.

9. The coextruded block composite of claim 4, in which the first, second, and third average diameters are adapted to give the coextruded block a gradient pore structure.

10. The coextruded block composite of claim 4, in which the granular component of the third block is selected from the group consisting of activated carbon, ceramic particles, zeolite particles, inert particles, sand, surface charge-modified particles, and mixtures thereof.

11. A filter medium which comprises the coextruded block composite of claim 4.

12. The coextruded block composite of claim 2, in which the granular component of the second block is selected from the group consisting of activated carbon, ceramic particles, zeolite particles, inert particles, sand, surface charge-modified particles, and mixtures thereof.

13. The coextruded block composite of claim 2, in which the second block is continuous.

14. A filter medium which comprises the coextruded block composite of claim 2.

15. The coextruded block composite of claim 1, in which the second block is impermeable to fluids.

16. The coextruded block composite of claim 15, in which the second block is a thermoplastic polyolefin block.

17. The coextruded block composite of claim 16, in which the thermoplastic polyolefin block is a polypropylene block.

18. The coextruded block composite of claim 15, in which the second block is a thermoplastic polyolefin block.

19. The coextruded block composite of claim 18, in which the thermoplastic polyolefin block is a polypropylene block.

20. The coextruded block component of claim 15, in which the second block is continuous.

21. The coextruded block component of claim 15, in which the second block is discontinuous.

22. The coextruded block composite of claim 15, in which the second block is adapted to direct a fluid through the first block from a first portion thereof to a second portion thereof along a predetermined pathway.

23. The coextruded block composite of claim 1, in which the granular component of the first block is selected from the group consisting of activated carbon, ceramic particles, zeolite particles, inert particles, sand, surface charge-modified particles, and mixtures thereof.

24. A filter medium which comprises the coextruded block composite of claim 1.

25. In a method of preparing a coextruded block composite which comprises:

extruding a mixture of granules and a thermoplastic binder from an extruder barrel into a die;

heating the mixture to a temperature which is greater than the softening temperature of the thermoplastic binder and less than the softening temperature of the granules;

applying sufficient back pressure to the heated mixture within the die to covert the heated mixture into a substantially homogeneous composite material;

cooling the composite material to a temperature below the softening point of the thermoplastic binder; and extruding the composite material from the die;

the improvement which comprises:

exciting the die and/or extruder barrel at at least one location with subsonic, sonic, or ultrasonic energy which varies in frequency and/or amplitude in a manner adapted to aid in either or both the extrusion of the mixture of granules and a thermoplastic binder from an extruder barrel into a die and the extrusion of the composite material from the die.

* * * * *